(12) United States Patent
Kranz et al.

(10) Patent No.: US 6,363,059 B1
(45) Date of Patent: Mar. 26, 2002

(54) DIGITAL TELECOMMUNICATION FACILITY

(75) Inventors: Christian Kranz, Ratingen Lintorf; Stefan Heinen, Krefeld, both of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/149,817

(22) Filed: Sep. 8, 1998

(30) Foreign Application Priority Data

Sep. 8, 1997 (DE) .......................... 197 39 264

(51) Int. Cl.$^7$ .......................... H04B 7/26; H04B 7/212; H04Q 7/20
(52) U.S. Cl. .......................... 370/337; 370/347; 370/915; 455/426; 455/403
(58) Field of Search ................. 370/277, 280, 370/294, 310, 321, 330, 336–337, 345, 347, 442, 478, 480, 915; 455/422, 403, 426, 418, 465, 39, 74.1; 375/132

(56) References Cited

U.S. PATENT DOCUMENTS 5,311,504 A * 5/1994 Colamonico et al. ....... 370/330
5,390,166 A * 2/1995 Rohani et al. .............. 370/337
6,108,522 A * 8/2000 Blanke ....................... 455/39

FOREIGN PATENT DOCUMENTS

| DE | 3723759 A1 | 1/1988 |
| DE | 4432928 A1 | 3/1996 |
| DE | 19623279 C1 | 12/1997 |
| WO | WO 99/09678 | * 2/1999 |

OTHER PUBLICATIONS

"Struktur des DECT–Standards", Ulrich Pilger, Nachrichtentechnik, Elektron., Berlin 42, 1992, pp. 23–29.

* cited by examiner

Primary Examiner—Wellington Chin
Assistant Examiner—Maikhanh Tran
(74) Attorney, Agent, or Firm—Herbert L. Lerner; Laurence A. Greenberg; Werner B. Stemer

(57) ABSTRACT

A digital telecommunication facility has a base station and one or more cordless mobile units that communicate with the base station through a TDMA process. The mobile units and the base station change the transmitting/receiving frequency within which they communicate only once per TDMA frame and the retain the new transmitting/receiving frequency for a time corresponding to an entire TDMA frame.

9 Claims, 2 Drawing Sheets

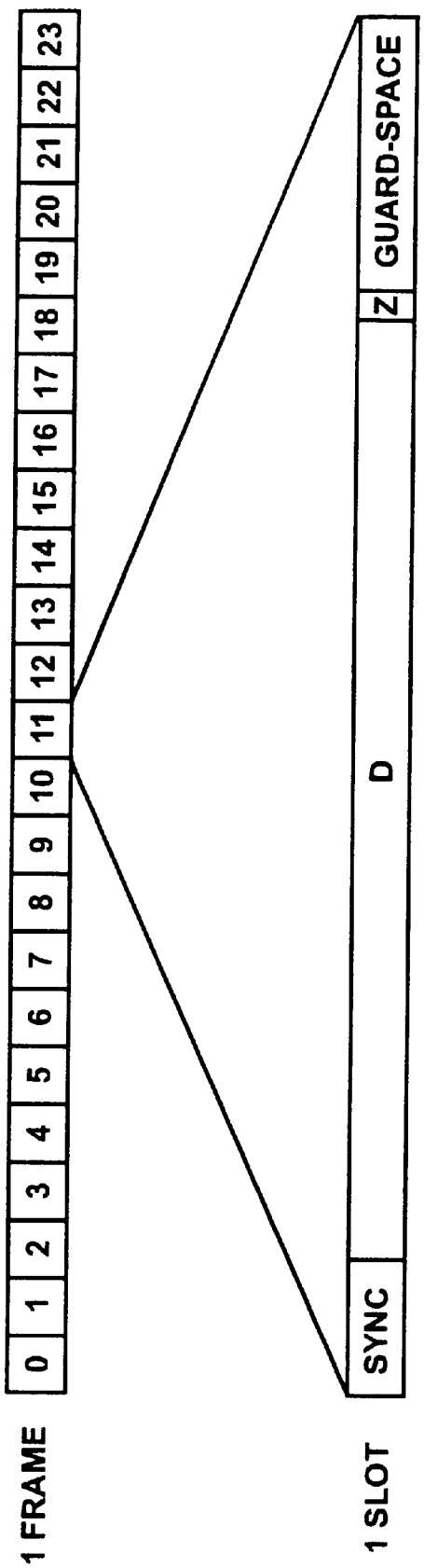

DIGITAL TELECOMMUNICATION FACILITY

BACKGROUND OF THE INVENTION

Field of the Invention

The invention resides in the telecommunications field. More specifically, the invention pertains to a device in a digital telecommunication facility comprising one or more cordless mobile units. The mobile units and the base station to which the mobile units are linked or can be linked communicate in accordance with a TDMA process.

Such a telecommunication facility is, for example, a radio system operating in accordance with the DECT standard.

The basic configuration of such a radio system is illustrated in FIG. 1.

The system of FIG. 1 includes a base station B and a plurality of cordless telecommunication terminals TE1 to TEn. In the exemplary embodiment, the cordless telecommunication terminals TE1 to TEn are mobile telephones which are capable of communicating with the base station B by radio.

Instead of the cordless telecommunication terminals TE1 to TEn or in addition to these, cordless connection sockets can be used for connecting wire-connected telecommunication terminals. The cordless telecommunication terminals, the cordless connection sockets, and similar facilities constitute the above-mentioned mobile units.

The data transmission between the base station B and the mobile units takes place in units of so-called frames or, more accurately, TDMA frames. The acronym TDMA stands for "Time Division Multiple Access" and signifies that the frames are structured in such a manner that the base station can communicate consecutively in successive time slots (or slots) of a respective frame with all mobile units that are registered with it. The communication can then be effected by utilizing the full bandwidth of the transmission channel. The TDMA process is sufficiently well known and will, therefore, not be explained in further detail. The basic structure of a (TDMA) frame suitable for performing the TDMA process will now be explained with reference to FIG. 2.

The frame shown in FIG. 2, i.e. the DECT full-slot frame considered here, is composed of 24 time slots or slots (full slots) of identical length. The first 12 of the 24 slots are transmitted from the base station to the mobile units and the subsequent, second 12 slots are transmitted from the mobile units to the base station. More accurately, the zeroth slot of each frame is transmitted from the base station to a zeroth mobile unit, the first slot is transmitted from the base station to a first mobile unit, the second slot is transmitted from the base station to a second mobile unit, . . . , the eleventh slot is transmitted from the base station to an eleventh mobile unit. Conversely, the twelfth slot is transmitted from the zeroth mobile unit to the base station, the thirteenth slot from the first mobile unit to the base station, the fourteenth slot from the second mobile unit to the base station, . . . , and the twenty-third slot is transmitted from the eleventh mobile unit to the base station.

One frame, i.e. the 24 slots of a frame, is transmitted within 10 ms. Each slot comprises 480 bits and is transmitted within around 417 $\mu$s (within 416.66 $\mu$s). As indicated in FIG. 2, the 480 bits are distributed over a 32-bit-wide sync field, a 388-bit-wide D field, a 4-bit-wide Z field, and a 56-bit-wide guard space field.

320 bits are reserved within the D field for the transmission of the user data which are actually of interest (for example speech data). The base station can thus send user data comprising 320 bits to each of the mobile units and receive the same amount of user data from each of the mobile units within 10 ms; the transmission rate for user data between the base station and each of the mobile units is therefore 32kbit/s in each direction.

The transmitting/receiving frequencies used for the exchange of information and data between a base station B and the mobile telephones TE1 . . . TEn can be selected from a total of 10 different frequencies. They are determined by the respective mobile units in dependence on the local transmitting and receiving conditions and can change from slot to slot for this reason.

The base station, especially, but also the mobile units which, for the sake of simplicity, will be called by the general term "radio units" in the text which follows, must therefore be capable of changing the transmitting/receiving frequency within a short time.

There are two different possibilities for changing the transmitting/receiving frequency in the radio units of a DECT system.

One of the possibilities consists in changing the frequency during the period of the aforementioned guard space field of a respective slot. This can be done because there are no user data transmitted in the guard space field. However, such a frequency change can only be performed with a relatively great effort because of the shortness of the available time.

The other possibility consists in providing (reserving) in each case a separate slot for the frequency change, namely a so-called blind slot. The radio units using this possibility of frequency changing are the so-called slow hopping radio units. In this type of radio units, a much longer time is available in each case for any change in transmitting/receiving frequency which may be required, as a result of which the radio units can be configured in a much simpler way. On the other hand, however, only each second slot of a frame (for example the slots with the odd numbers in the frame according to FIG. 2) can now be used for data transmission. This means that the number of mobile units that can be operated from one base station is reduced by half.

Neither of the prior art possibilities for changing the transmitting/receiving frequency is optimum. Both force upon the system disadvantages that must be accepted, and the elimination of which or compensation for which requires a considerable amount of effort.

SUMMARY OF THE INVENTION

It is accordingly an object of the invention to provide a digital telecommuncation system, which overcomes the above-mentioned disadvantages of the prior art devices and methods of this general type and which reduces the effort for adjusting and correcting the transmitting/receiving frequency to a minimum.

With the foregoing and other objects in view there is provided, in accordance with the invention, a digital telecommunication facility, comprising a base station and one or more cordless mobile units adapted to communicate with one another by a TDMA process having defined TDMA frames. The base station and the at least one cordless mobile unit changing a transmitting/receiving frequency once per TDMA frame and retaining an adopted transmitting/receiving frequency for a time corresponding to a duration of one TDMA frame.

In other words, the mobile unit(s) and the base station are designed so that they change the transmitting/receiving frequency after each TDMA frame and retain the new transmitting/receiving frequency for the length of one TDMA frame.

Due to the less frequent changing of transmitting/receiving frequency it becomes possible to reduce the time to be provided for the changeover per unit time. Fewer and/or shorter slots, if any, are required to be reserved for changing and/or correcting the transmitting/receiving frequencies.

In accordance with an added feature of the invention, the base station and the at least one mobile unit have stored therein lists containing a sequence of various transmitting/receiving frequencies to follow one another.

In accordance with an additional feature of the invention, successive transmitting/receiving frequencies adopted and retained by the base station and the at least one cordless mobile unit are relatively far apart from one another within a given available communication bandwidth.

In accordance with another feature of the invention, the at least one mobile unit and the base station output data received in a last-received undisturbed TDMA frame if an instantaneous transmitting/receiving frequency is disturbed.

In accordance with a further feature of the invention, the at least one mobile unit is adapted to individually select the transmitting/receiving frequency for setting up an initial connection with the base station. In a preferred embodiment, the mobile unit selects the transmitting/receiving frequency by taking into consideration an RSSI measurement.

In accordance with again a further feature of the invention, the mobile unit, upon requesting initial communication with the base station at a selected frequency, waits for a sync bearer at the selected frequency.

In accordance with a concomitant feature of the invention, the mobile unit then changes the selected transmitting/receiving frequency if no sync bearer is received within a predetermined time.

The frequency change taking place only once per frame does not lead to an impairment of the transmission quality or, if at all, to one that is neglibile and essentially not perceptible. This is because, if the transmitting/receiving frequency currently used is disturbed, only the data of a single frame (for example 10 ms) of the information to be transmitted, may not be transmitted without errors. One or more such interruptions are not or scarcely noticeable especially if the information transmitted or to be transmitted in the last frame is transmitted in the disturbed frame.

Thus, a telecommunication facility has been created in which the effort for adjusting and correcting the transmitting/receiving frequency can be reduced to a minimum.

The regular change in transmitting/receiving frequency has also been found to be advantageous in another respect: it makes it possible to utilize the frequency band available for operating the telecommunication facility essentially uniformly over its entire bandwidth. At a frame length of 10 ms, 100 different transmitting/receiving frequencies can be used per second. Averaged over time, the operation of the telecommunication facility appears as wideband noise in the frequency band used. This reliably eliminates the continuous use of a particular or a few frequencies, which especially interferes with other facilities.

Other features which are considered as characteristic for the invention are set forth in the appended claims.

Although the invention is illustrated and described herein as embodied in a digital telecommunication facility, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a diagrammatic view illustrating the format of the data exchanged between a base station and telecommunication terminals of a radio system operating in accordance with the DECT standard.

DESCRIPTION OF THE PREFERRED EMBODIMENTS

Figure 1:
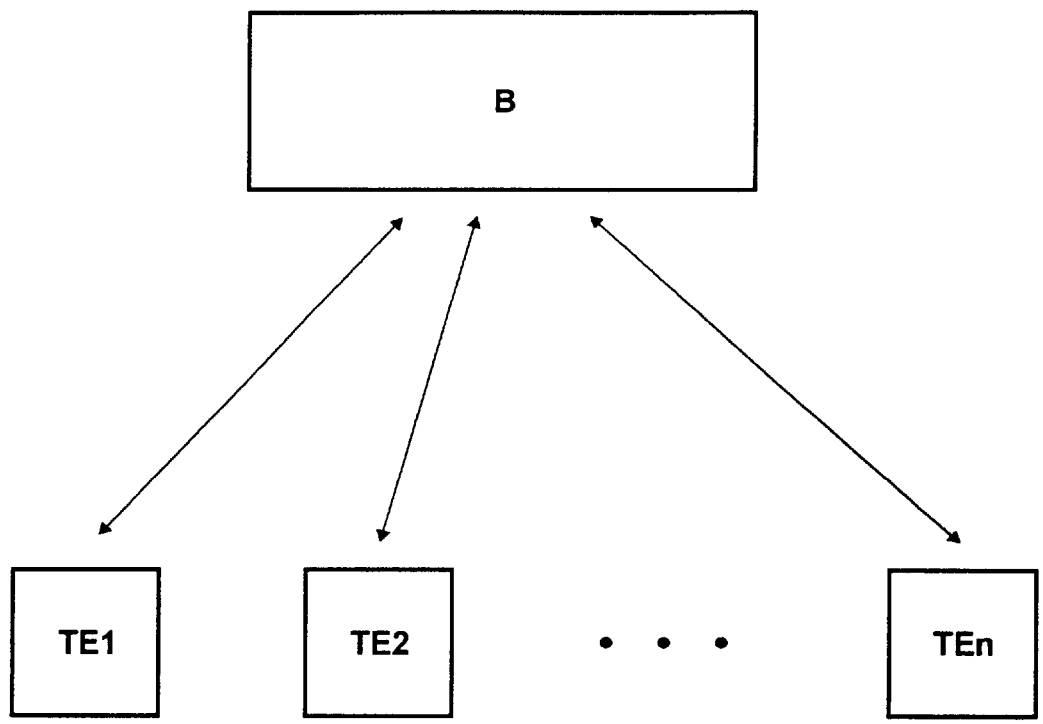
FIG. 1 is a diagrammatic view of a configuration of a radio system operating in accordance with the DECT standard.

The telecommunication facility which will now be described in greater detail is, like a system operating in accordance with the DECT standard, a digital telecommunication facility that comprises one or more cordless mobile units. However, the system of the invention is set up to be used in the so-called 2.4 GHz ISM band which extends from 2400 to 2483.5 MHz. The 2.4 GHz ISM band has been released for operating such telecommunication facilities by the FCC (Federal Communication Commission), under certain conditions.

It should nevertheless be noted that the telecommunications facility according to the invention is suitable not only for use in the 2.4 GHz ISM band, but, in principle, can also be used within any other frequency bands.

Communication between the mobile units and the base station can take place via TDMA frames comprising a multiplicity of time slots or slots, respectively, as in the system described initially. Similarly, the TDMA frames can have a length of 10 ms in each case. However, the structure and the length of the frames are not restricted to this. They can also be specified to be anything else.

In the exemplary embodiment, the transmission rate with which the individual bits of the information to be transmitted are transmitted is halved compared with the bit transmission rate of the above-described telecommunication facility. Accordingly, the amount of data that can be transmitted or exchanged per unit time is reduced. However, the invention can be applied not only in telecommunication facilities having this bit transmission rate but can also be used basically with any other bit transmission rates.

Independently of this but also differently from the above-described telecommunication facility, the transmitting/receiving frequencies are changed only once per frame. The selected transmitting/receiving frequency is used for the communication between the base station and all connected mobile units. It is no longer possible for each mobile unit to determine individually the frequency via which communication with the base station is to take place.

At least 75 frequencies—even 90 frequencies in the exemplary embodiment—are available to be used with the same frequency (equally often) on average.

Which of these frequencies is in each case used as the next transmitting/receiving frequency or, more accurately, the order in which the available frequencies are to be used as transmitting/receiving frequencies is laid down in a pseudo-random frequency list which is available both in the base station and in the mobile units.

The pseudo-random frequency list is run through sequentially in synchronism by the base station and the mobile unit. In other words, the frequency changes (occurring simultaneously in the base station and the mobile unit) are set according to the frequency represented as the respectively next entry in the pseudo-random frequency list. The frequency changes are not triggered by impaired transmitting/receiving conditions but are performed independently of these frame by frame at predetermined times.

If the target frequency (the frequency to be hopped to) is disturbed, this will not change anything in the operating sequence, at least not initially. Due to the synchronous sweep through pseudo-random frequency lists with identical content, the mobile unit and the base station will automatically meet again at the next undisturbed frequency (according to the frequency list) after a certain time (in the next frame or a later one).

In the exemplary embodiment considered here, the base station and the mobile units are designed in such a manner that they can recognize when the received data have been or can be transmitted with errors due to the use of a disturbed transmitting/receiving frequency. In this case, the user data last received without errors (for example speech data) are output by the base station or the relevant mobile units, respectively. In this manner, even disturbances extending over three successive frames can be bridged without perceptible dropouts.

Disturbances lasting longer can be avoided if the pseudo-random frequency list is set up in such a manner that there is a large frequency interval between frequencies to be used successively as transmitting/receiving frequency. This reduces the risk that interference sources such as, for example, microwave ovens, which typically have a wide bandwidth, cause a disturbance lasting for a relatively long time (several successive frames).

The mobile units, when a connection is to be set up with the base station, select a certain transmitting/receiving frequency via which they can communicate with the base station. In a well-equipped mobile unit (with a high degree of comfort), the selection is performed by using a radio signal strength indication (RSSI) measurement. A frequency is selected which will be received without interference with high field strength by the mobile unit concerned. As a result, it is highly probable that the first contact between the relevant mobile unit and the base station can be made without interference. In the case of mobile units of simpler construction, the frequency via which contact is to be established can also be selected in accordance with the principle of random selection.

At the frequency, selected by whatever means, the mobile unit waits until a so-called sync bearer is received by the base station. The sync bearer is a predetermined (synchronization) data word which is emitted by the base station in slots designed for data transmission if and for as long as the relevant slots are not reserved for communicating with mobile units registered in the base station. If no sync bearer has been received after a predetermined time, the mobile unit changes the receiving frequency and begins again with the search.

The sync bearer is transmitted several times within the relevant slots. As a result, it is possible to prevent, with a very high probability, the expected sync bearer from not being received only because the relevant mobile unit is not switched to reception for a short time.

When the mobile unit has received the sync bearer (on average, this is the case after approximately 0.5 s at the latest), it can track the frequency of the base station by means of the pseudo-random frequency list.

With a frame duration of 10 ms, the 90 different transmitting/receiving frequencies are hopped through in less than one second. The consequence of this is that, averaged in time, a wideband output spectrum is generated in the frequency band used or, respectively, available, by the telecommunication facility described. Disturbances based on the fact that one and the same frequency or a few different frequencies are continuously used can be reliably eliminated, as a result.

Due to the fact that the transmitting/receiving frequency is and must no longer be changed slot by slot but only frame by frame, as distinct from the system described initially, fewer or shorter slots can be provided for changing and/or correcting the transmitting/receiving frequency. As a result, the proportion of time available for exchanging user data per unit time (per frame) is greater both in relative and in absolute terms. This can be used for transmitting the information to be exchanged with a higher quality or to enable more mobile units to be operated from the base station (the quality remaining the same).

In summary, the invention reduces the effort for adjusting and correcting the transmitting/receiving frequency to a minimum in the telecommunication facility described.

We claim:

1. A digital telecommunication facility, comprising:
a base station and at least one cordless mobile unit adapted to communicate with one another by a TDMA process having defined TDMA frames, the base station and the at least one cordless mobile unit changing a transmitting/receiving frequency once per TDMA frame and retaining an adopted transmitting/receiving frequency for a time corresponding to a duration of one TDMA frame.

2. The telecommunication facility according to claim 1, wherein the base station and the at least one mobile unit have stored therein lists containing a sequence of various transmitting/receiving frequencies to follow one another.

3. The telecommunication facility according to claim 1, wherein successive transmitting/receiving frequencies adopted and retained by the base station and the at least one cordless mobile unit are relatively far apart from one another within a given available communication bandwidth.

4. The telecommunication facility according to claim 1, wherein the at least one mobile unit and the base station output data received in a last-received undisturbed TDMA frame if an instantaneous transmitting/receiving frequency is disturbed.

5. The telecommunication facility according to claim 4, wherein the at least one mobile unit is adapted to individually select the transmitting/receiving frequency for setting up an initial connection with the base station.

6. The telecommunication facility according to claim 1, wherein the at least one mobile unit is adapted to individually select the transmitting/receiving frequency for setting up an initial connection with the base station.

7. The telecommunication facility according to claim 6, wherein the at least one mobile unit selects the transmitting/receiving frequency by taking into consideration an RSSI measurement.

8. The telecommunication facility according to claim 6, wherein the at least one mobile unit, upon requesting initial communication with the base station at a selected frequency, waits for a sync bearer at the selected frequency.

9. The telecommunication facility according to claim 8, wherein the at least one mobile unit changes the selected transmitting/receiving frequency if no sync bearer is received within a predetermined time.

* * * * *